(12) United States Patent
Watson et al.

(10) Patent No.: US 9,286,634 B2
(45) Date of Patent: Mar. 15, 2016

(54) FINANCIAL SYSTEMS

(75) Inventors: Keith Watson, Edinburgh (GB); Andy Pratt, Edinburgh (GB)

(73) Assignee: STANDARD LIFE EMPLOYEE SERVICES LIMITED, Edinburgh (GB)

( * ) Notice: Subject to any disclaimer, the term of this patent is extended or adjusted under 35 U.S.C. 154(b) by 1392 days.

(21) Appl. No.: 12/513,745

(22) PCT Filed: Nov. 6, 2007

(86) PCT No.: PCT/GB2007/004236

§ 371 (c)(1),
(2), (4) Date: Sep. 9, 2009

(87) PCT Pub. No.: WO2008/056133

PCT Pub. Date: May 15, 2008

(65) Prior Publication Data

US 2010/0042425 A1   Feb. 18, 2010

(30) Foreign Application Priority Data

Nov. 6, 2006   (GB) .................................. 0622063.6

(51) Int. Cl.
*G06Q 40/00*   (2012.01)
*G06F 9/54*   (2006.01)
*G06F 9/44*   (2006.01)

(52) U.S. Cl.
CPC ............... *G06Q 40/00* (2013.01); *G06F 9/541* (2013.01); *G06F 8/36* (2013.01)

(58) Field of Classification Search
None
See application file for complete search history.

(56) References Cited

U.S. PATENT DOCUMENTS

| 7,926,030 B1* | 4/2011 | Harmon ................. G06F 9/4446 717/121 |
| 2002/0138582 A1 | 9/2002 | Chandra et al. |
| 2007/0143337 A1* | 6/2007 | Mangan ........................ 707/102 |
| 2007/0190941 A1* | 8/2007 | Fein ........................ G06Q 30/02 455/41.2 |
| 2008/0040418 A1* | 2/2008 | Power ........................... 709/202 |

OTHER PUBLICATIONS

Adatia et al., "Professional EJB," Jul. 2001, Wrox Press Ltd.®, Ch. 9, pp. 363-416.
International Search Report for Application No. PCT/GB2007/004236 dated May 19, 2008.

* cited by examiner

*Primary Examiner* — Olabode Akintola
(74) *Attorney, Agent, or Firm* — Marshall, Gerstein & Borun LLP; Randall G. Rueth

(57) ABSTRACT

A method and system (1) for incorporating legacy systems in a service oriented architecture (SOA) includes decoupling legacy system business services from legacy system data services by creating, from the legacy system business services and data services, a set of (e.g. Java WebSphere®) SOA business services (5a-5c) for transactions and (e.g. DB2) stored procedures (7a-7d) for SOA data services. The business services are constructed from one or more data services and the transactional integrity of the transaction is maintained, in use. The stored procedures may be written to a transaction log and a check made to verify that all of the stored procedures from which the business service is constructed have been written to the log.

26 Claims, 12 Drawing Sheets

FINANCIAL SYSTEMS

The present invention relates to improvements in and relating to financial systems and in particular to systems and methods that efficiently incorporate legacy systems into new or modernised financial systems.

BACKGROUND TO THE INVENTION

Organisations such as banks, life assurance and pension providers and other similar financial services organisations have to maintain computer records and conduct financial and other transactions on behalf of their customers and their agents.

The computer systems used by these organisations often comprise a variety of relational and hierarchical databases and other file types which have been commissioned and developed piecemeal with a single specific purpose in mind and without the overall aim of creating a single integrated system. Systems of this type are known as legacy systems.

Many organisations attempted a wholesale rewrite of their legacy systems in the early-mid 1990s and discovered that it was much more complex than they had anticipated. Many of the projects failed, or left another legacy of half-finished applications, or applications that were suitable only for read-only use.

Migrating away from legacy systems is difficult for a variety of reasons: older systems were often built as 'monolithic' systems, this means the system does not function as a series of communicating components; rather, it acts as a whole, or not at all. This makes modernising the system a tricky process, in that it is difficult to modernise a piece at a time, since all the pieces are tightly coupled. Software projects will typically work better if they are smaller, but this option is not present with many legacy systems; hence, the difficulties experienced in many modernisation programmes.

Modern tooling does not support legacy systems including hierarchical databases and VSAM files and software developers have little or no experience of them.

It is easy to envisage an ideal approach to modernising systems which involves throwing away all of the legacy systems and writing them again from scratch. However, such an approach would be extremely expensive.

SUMMARY OF THE INVENTION

It is an object of the present invention to provide a method of incorporating legacy systems in a modernised financial system.

It is another object of the present invention to provide an improved financial system.

In accordance with a first aspect of the invention there is provided a method of incorporating legacy systems in a service oriented architecture (SOA), the method comprising the steps of:

decoupling legacy system business services from legacy system data services;

creating, from the legacy system business services and data services, in a suitable program application, a set of SOA business services for transactions and stored procedures for SOA data services;

wherein one or more of said business services is constructed from one or more data service and the transactional integrity of the transaction is maintained, in use.

Preferably, the business service comprises program instructions for selectively accessing the stored procedures.

Preferably, the business service is in control of the transaction.

Preferably, the stored procedures are written to a transaction log and a check is made to verify that all of the stored procedures from which the business service is constructed have been written to the transaction log.

Preferably, the stored procedures are written to one or more database once verification has been received.

Preferably, the stored procedures have a type safe interface.

Preferably, the stored procedures are DB2 stored procedures. An Oracle or SQL server or other suitable database may also be used.

Preferably, the business services are run under websphere.

Preferably, the method further comprises accessing legacy system databases writing new programs as stored procedures.

Preferably, the legacy systems are accessed via stored procedures.

Preferably, the legacy system database so accessed is a hierarchical database.

Optionally, the legacy system database so accessed is a relational database.

The method of the present invention allows use of these stored procedures in place of existing IMS transactions to achieve the reuse of the underlying components and of the system.

Preferably, the method further comprises incorporating a staging database.

Preferably the staging database is a newly-developed database, storing similar data to the legacy system that the new system finds it simple to write to.

Preferably, the staging database is a relational database.

Preferably, the method comprises writing to the staging database, and implementing a scheduled process which picks the data up from the staging database and writes it to the legacy system.

Preferably, the scheduled process is run periodically.

In accordance with a second aspect of the invention there is provided a computer system having a service oriented architecture (SOA), the system comprising:

a set of SOA business services for transactions;

a set of stored procedures for SOA data services;

one or more of said business services being constructed from one or more data service and wherein at least one of the SOA business services and data services comprise decoupled legacy system business services and data services which have been configured to maintain the transactional integrity of the transaction, in use.

Preferably, the business service comprises program instructions for selectively accessing the stored procedures.

Preferably, the business service controls the transaction.

Preferably, the system further comprises a transaction log to which the stored procedures are written and a commit which verifies that all of the stored procedures from which the business service is constructed have been written to the transaction log.

Preferably, the stored procedures are written to one or more database once verification has been received.

Preferably, the stored procedures have a type safe interface.

Preferably, the stored procedures are DB2 stored procedures. An Oracle or SQL server or other suitable database may also be used.

Preferably, the business services are run under a J2EE compliant EJB that supports the XA two phase commit protocol. The business services may be run under Websphere, JBoss or Weblogic.

Preferably, the system further comprises stored procedures written to provide access to legacy systems.

Preferably, said stored procedures access the program components used by the legacy systems.

The system of the present invention allows use of these stored procedures in place of existing IMS transactions to achieve the reuse of the underlying program components.

Preferably, the system further comprises a staging database.

Preferably the staging database stores similar data to the legacy system that the new system finds it simple to write to.

Preferably, the staging database is a relational database.

Preferably, the staging database is written to, and scheduled process is implemented which picks the data up from the staging database and writes it to the legacy system.

Preferably, the scheduled process is run periodically.

EXAMPLES OF THE INVENTION

The present invention will now be described by way of example only with reference to the accompanying drawings in which.

Figure 9:
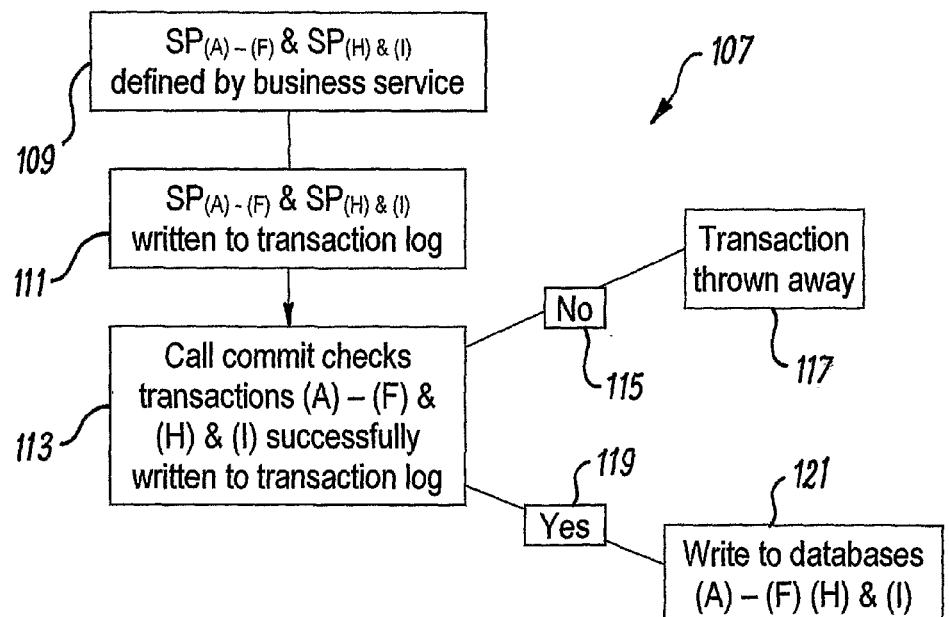
Figure 10:
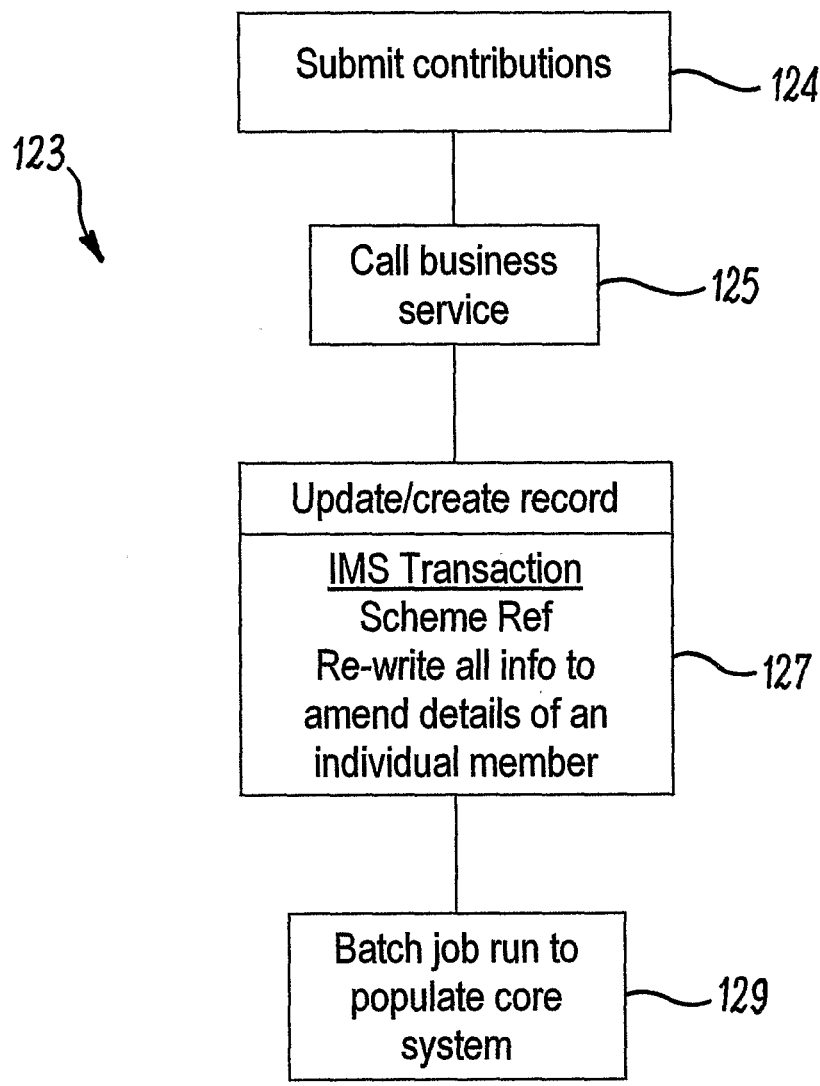
Figure 11:
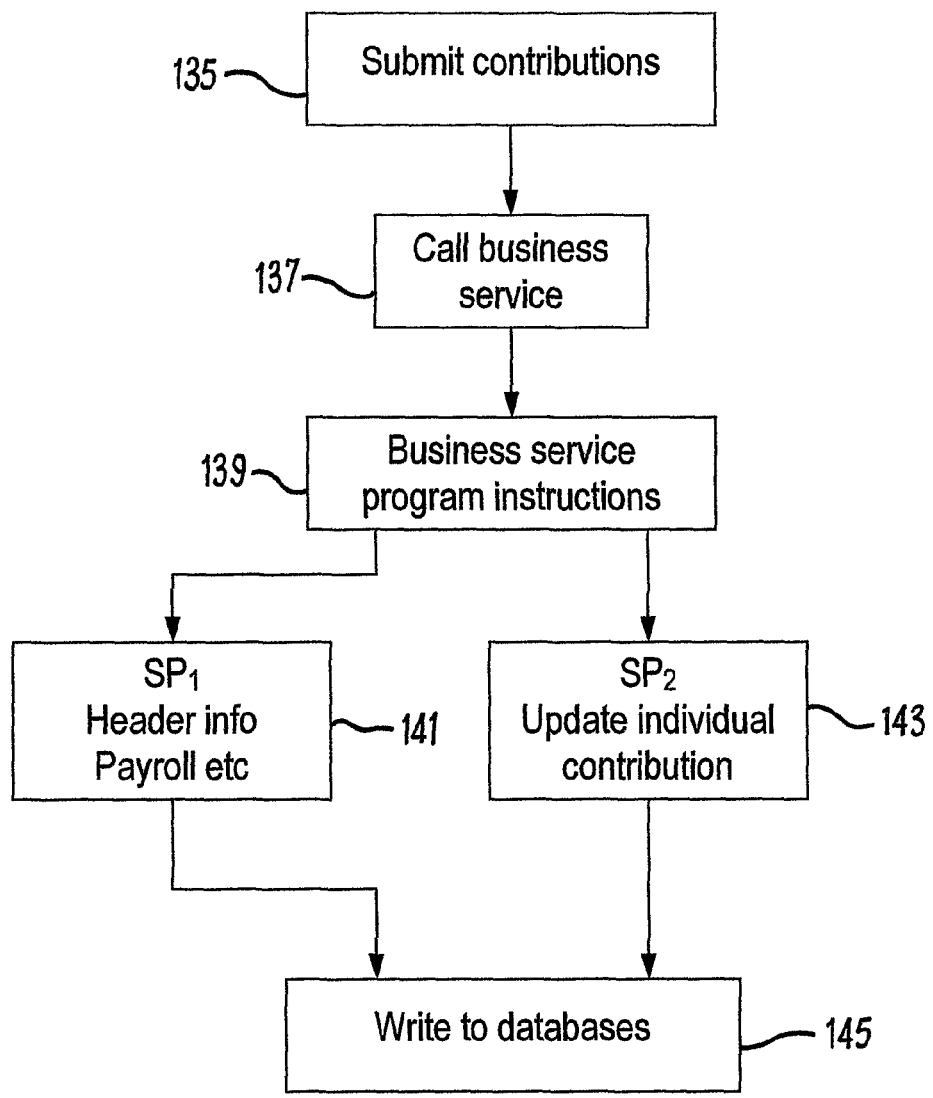
Figures 12, 13:
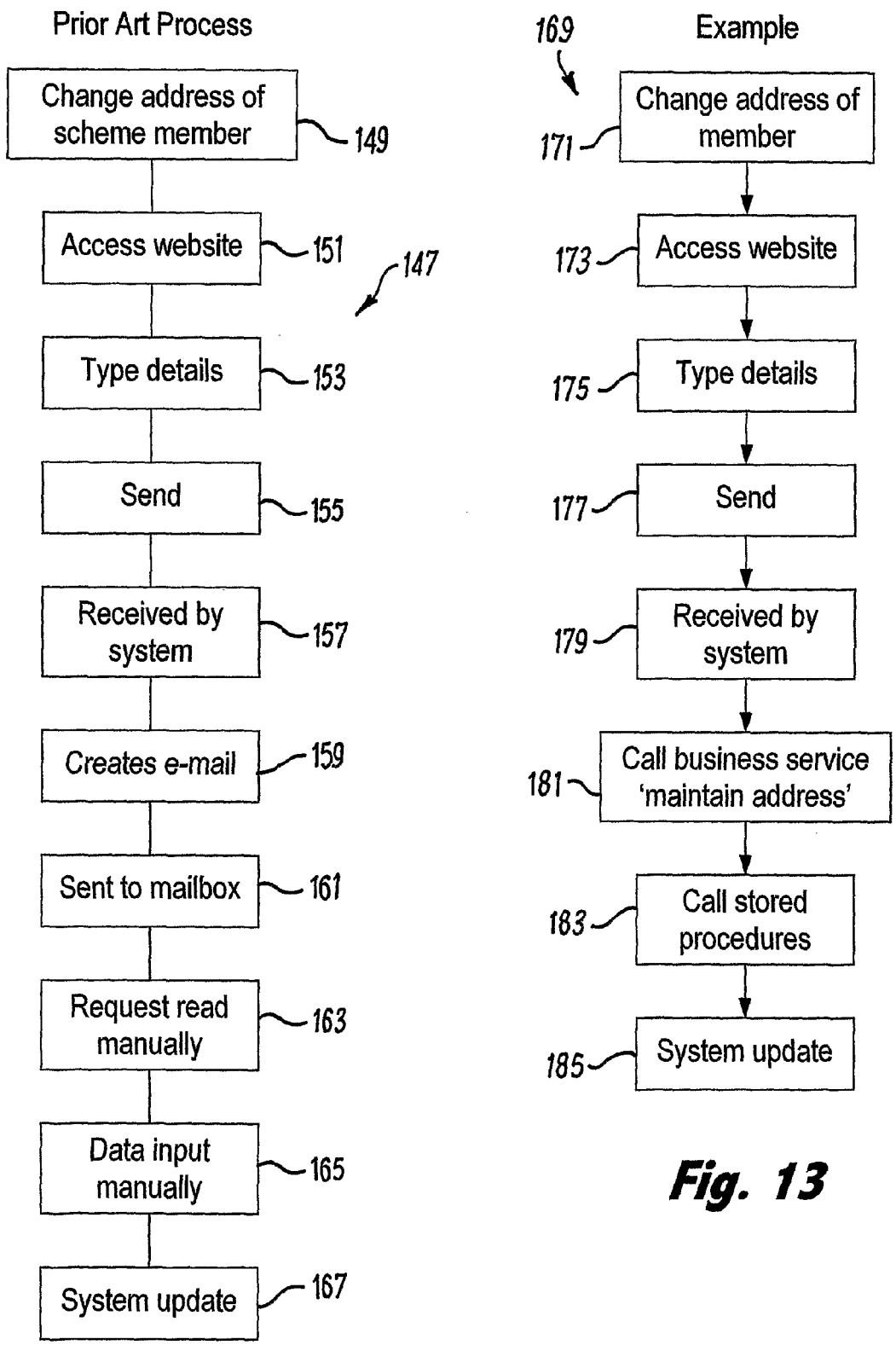
Figure 14:
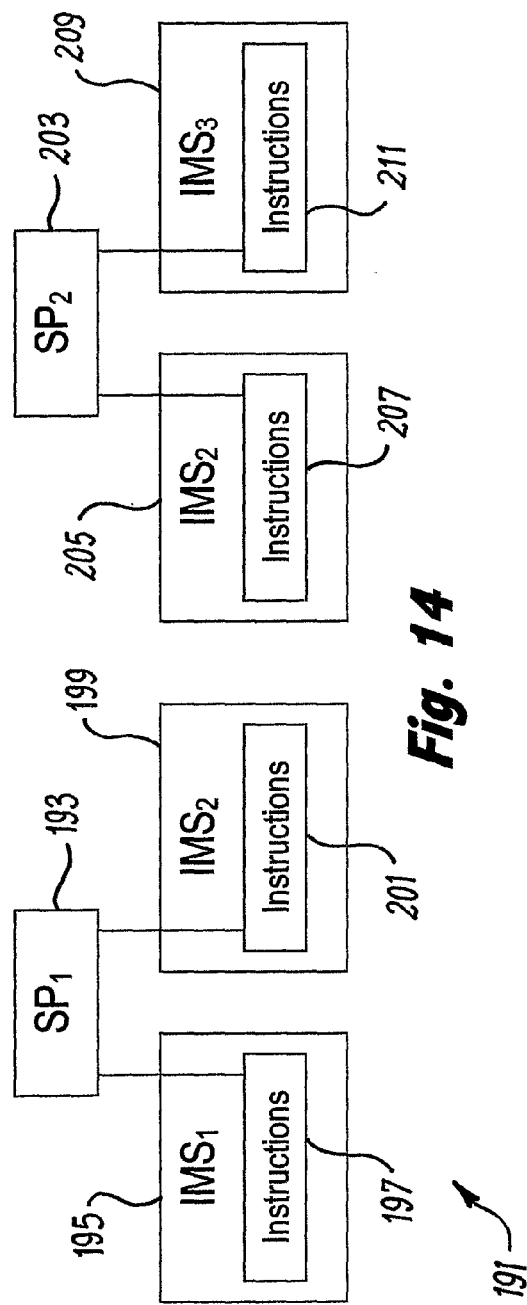
Figure 15:
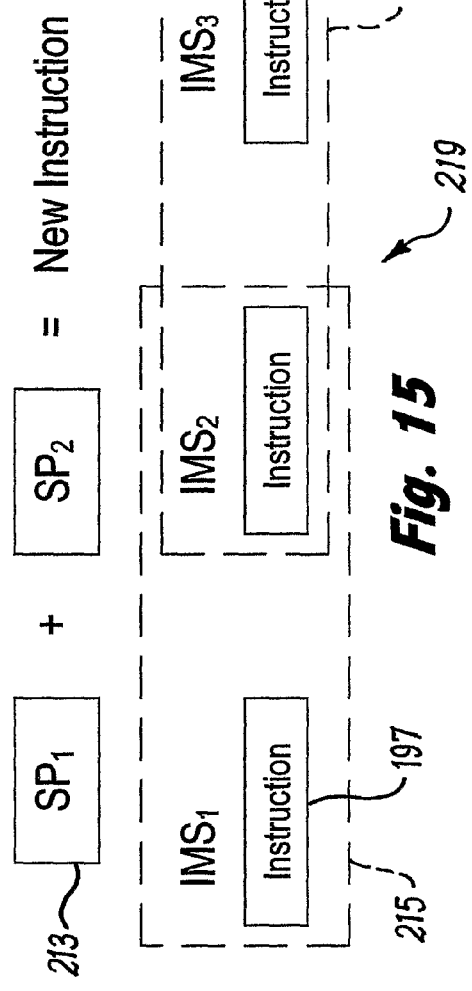
Figure 16:
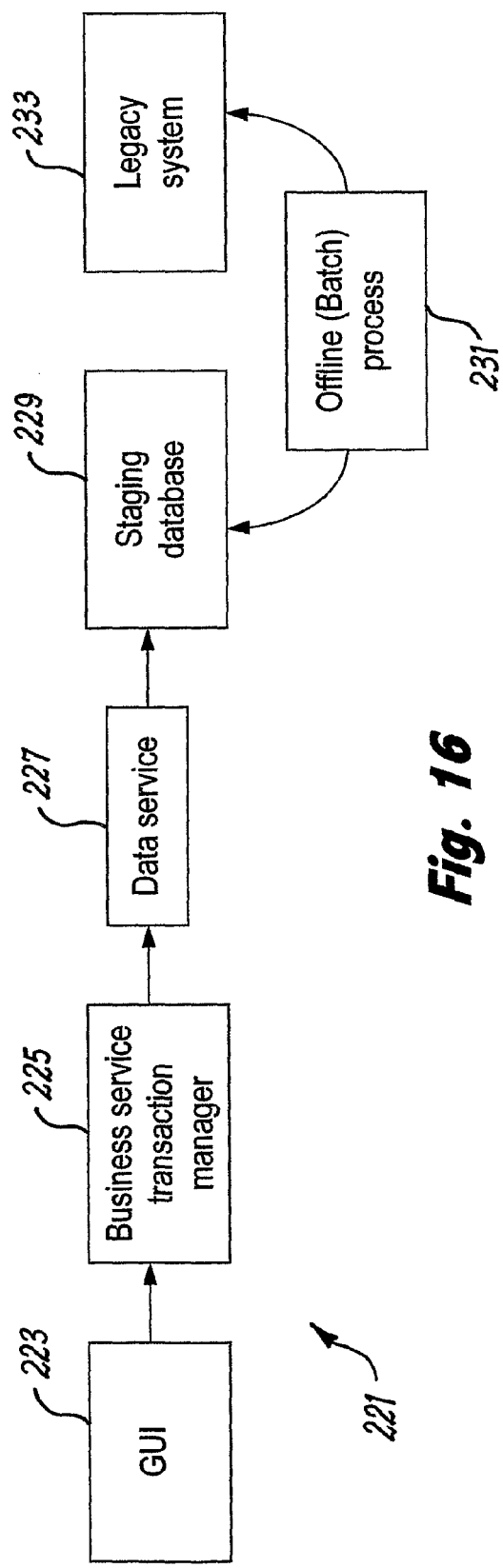

FIG. 9 provides details of the implementation of the amended "create bond" instruction in accordance with an example of the present invention;

FIG. 10 is a flow chart showing a further example of the prior art which, in this case, relates to the use of a financial system where pension contribution information is submitted;

FIG. 11 is a flow chart showing an example of the present invention in relation to the submission of pension contribution information;

FIG. 12 is a flow chart showing the steps undertaken in amending the details of a pension scheme member in accordance with the prior art;

FIG. 13 is a flow chart showing the steps undertaken in amending the details of a pension scheme member in accordance with the present invention;

FIG. 14 is a block diagram showing the wrapping of program instructions in accordance with the present invention;

FIG. 15 is a diagram showing further features of the process of wrapping program instructions in accordance with the present invention; and FIG. 16 is a block diagram showing the use of a staging database in accordance with the present invention.

Figure 1:
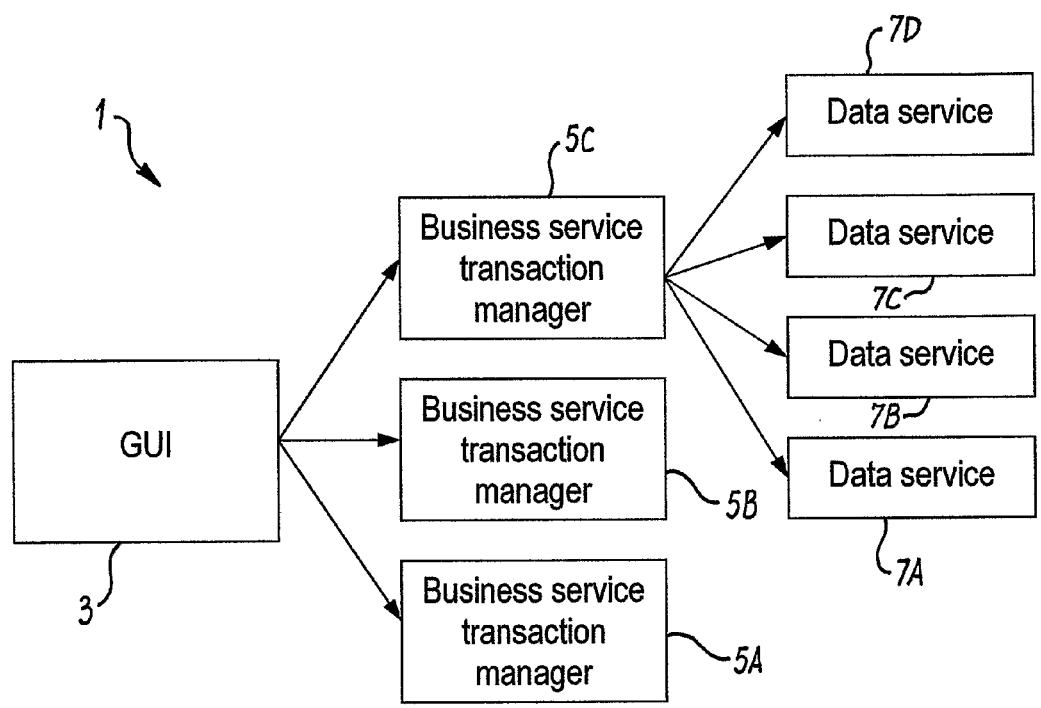
FIG. 1 is a block diagram of a service oriented architecture incorporating legacy systems in accordance with the present invention.

FIG. 1 shows a system in accordance with the present invention in which legacy systems are incorporated. The system is configured as a service oriented architecture in three layers. The first being a graphical user interface 3, a number of separate business services 5A, 5A and 5C of one or more transaction manager and a number of data services 7A, 7B, 7C and 7D. In this example of the present invention business service 5c accesses data services 7A, 7B, 7C and 7D in order to execute a transaction as specified by a user in control of the graphical user interface (GUI) 3.

Figure 2:
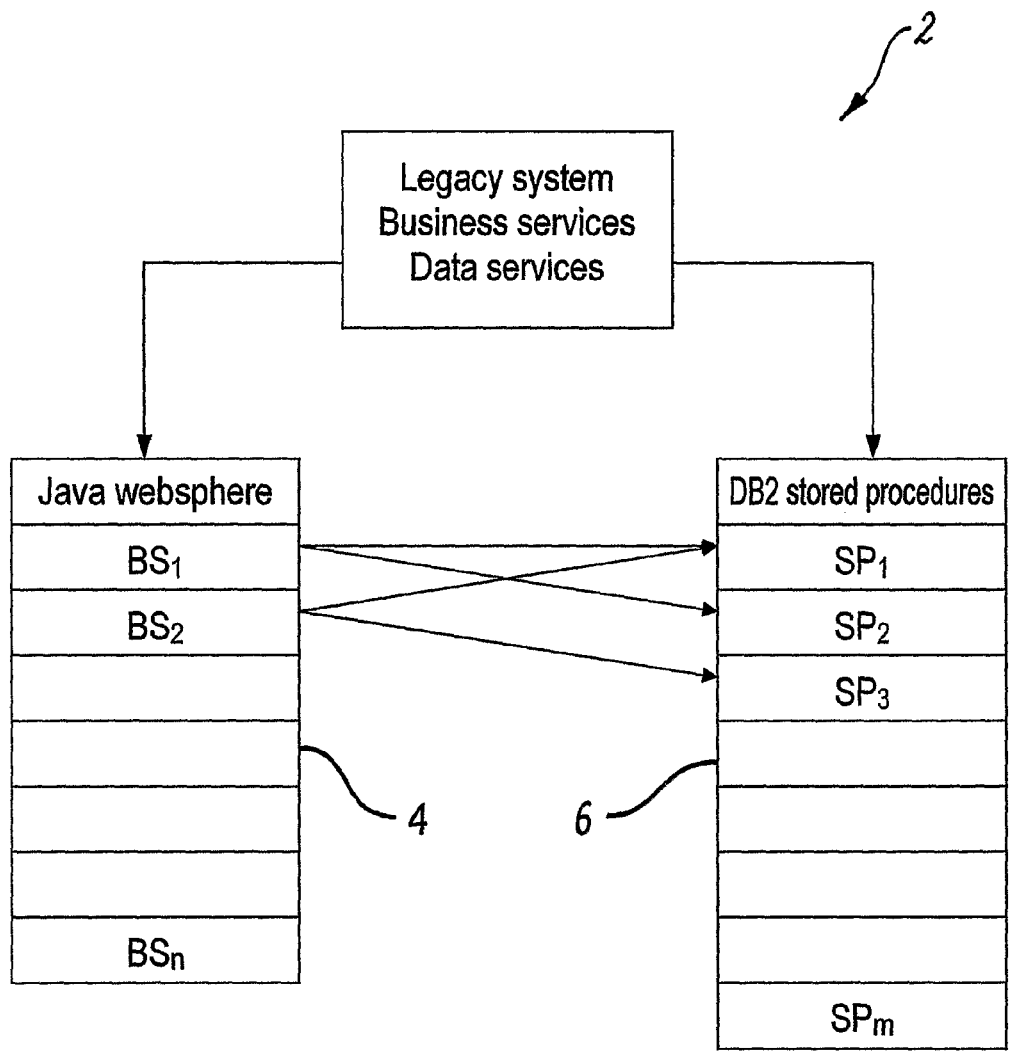
FIG. 2 is a block diagram illustrating an embodiment of the method of the present invention.

FIG. 2 shows the operation of an embodiment of the method of the present invention. In this example, the data service and business service components of the legacy systems 2 are decoupled from one another. The business services use java websphere and the data services use DB2 stored procedures. As will be described with reference to later examples, this implementation allows re-use of data services in more than one business service, in the manner typical of an SOA whilst maintaining transactional integrity.

Figure 3:
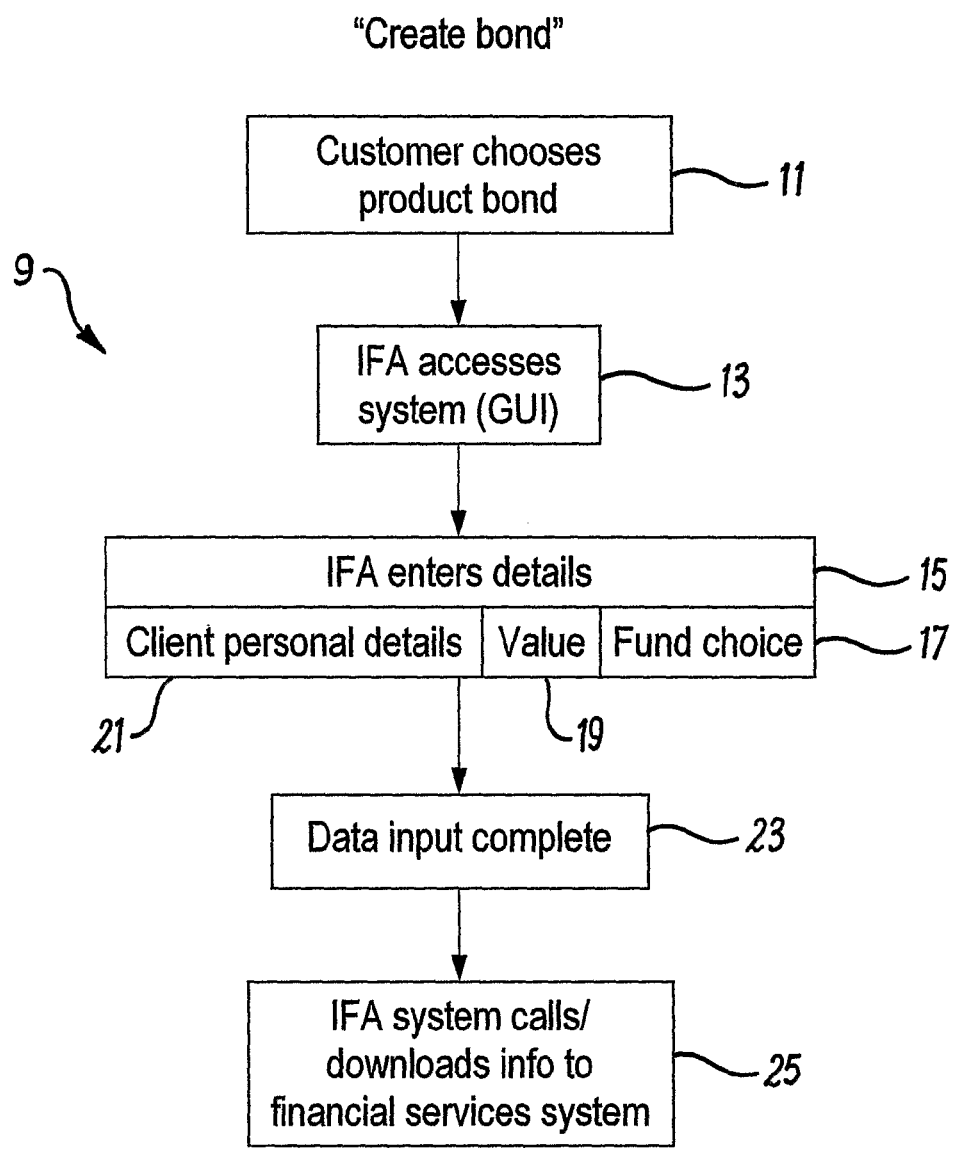
FIG. 3 is a flow chart showing the steps undertaken using a graphical user interface for the creation of a financial product (bond) in accordance with the present invention.

FIG. 3 relates to one example of the type of transaction that might be initiated by the user of a system in accordance with the present invention. The present invention relates primarily to financial services systems, including life assurance and pension administration systems. Such systems are typically used by independent financial advisors who, upon receiving instructions from their clients, will wish to buy products and services from a life assurance and pension provider. Typically the independent financial advisor (IFA) will have a personal computer or the like with a GUI which gives the IFA access to the life assurance and pension administration system operated by a life assurance and pensions company.

FIG. 3 shows an example of the type of product that might be bought by a client of the IFA and the steps which the IFA will go through, using the GUI to input relevant information in order to purchase a product on behalf of his client. Firstly the customer chooses the product 11, thereafter the IFA accesses the IFA's system which contains the GUI 13, the IFA then enters details supplied by the client, these include client personal details 21, value details relating to the value of the bond that the client wishes to purchase and information on the choice of funds that is being made by the client.

Once data input is complete 23 the information is ready to be sent to a-central system and this step is then actioned by the IFA's graphical user interface. Thereafter, the IFA's system incorporating the graphical user interface calls the financial services system 25.

Figure 4:
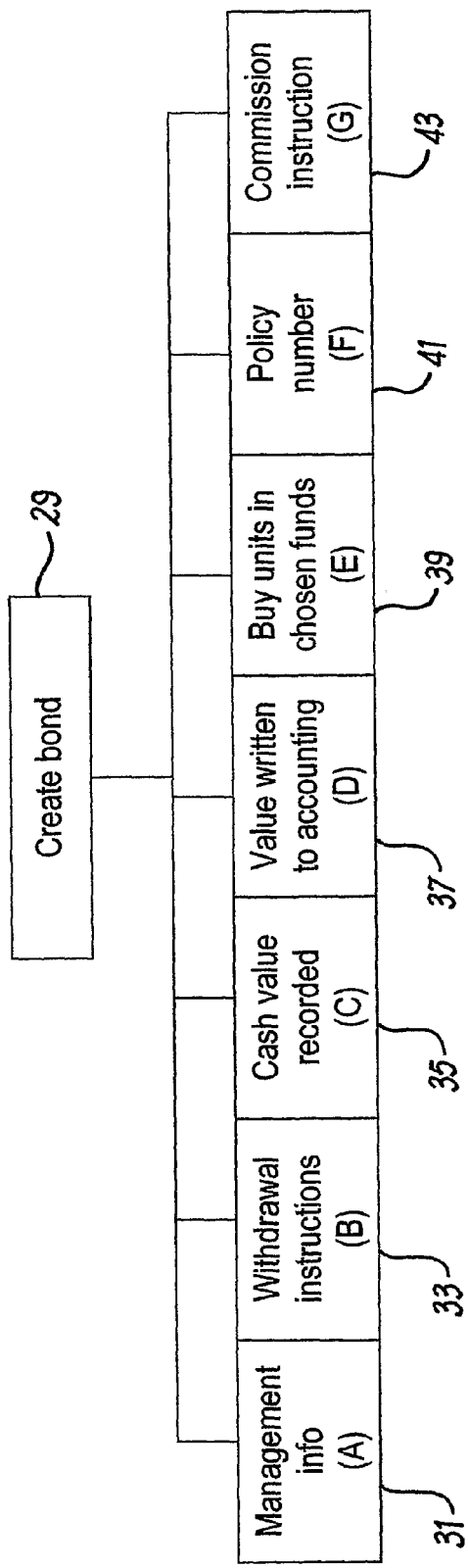
FIG. 4 is a block diagram showing the information extracted by a financial services system in response to the actions of the user of the graphical user interface of FIG. 3.

FIG. 4 is a diagram 27 which shows the "create bond" financial service 29 and different types of information that is extracted from the information input by the IFA. This will include management information (A) 31, withdrawal instructions (B) 33, cash value recorded (C) 35, value written to accounting (D) 37, buy units in chosen funds (E) 39, policy number (F) 41 and commission instruction (G) 43.

Figure 5:
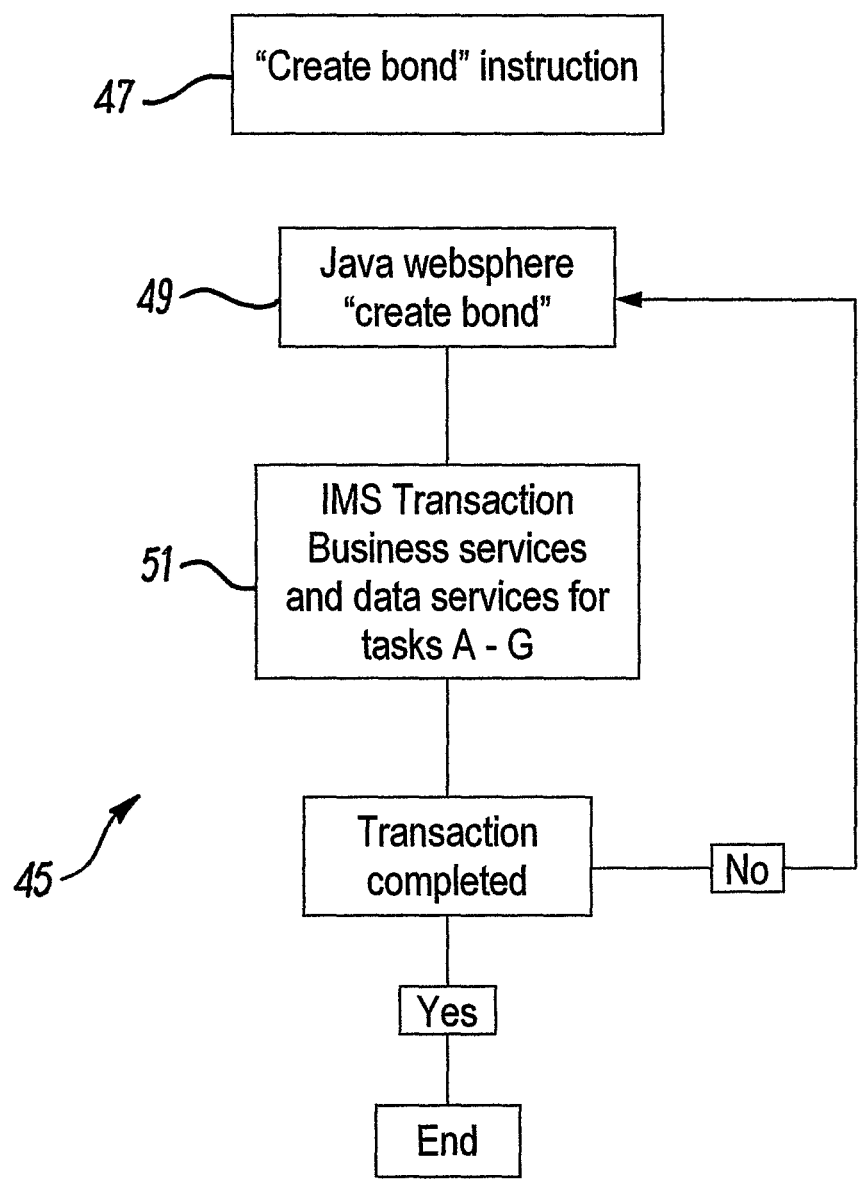
FIG. 5 is a flow chart showing a prior art transaction in a legacy system.

FIG. 5 shows the manner in which prior art legacy systems have been configured in order to action the "create bond" instruction described in FIGS. 3 and 4. The flow chart 45 or FIG. 5 describe the "create bond" instruction 47. Java websphere 49 is used to identify and locate a detailed IMS transaction 51.

The IMS transaction contains all of the information and all of the program instructions required in order to action the "create bond" instruction transaction as defined in FIG. 4 with reference to boxes 31 to 43. The IMS transaction therefore comprises a mixture of business services and data services which are tightly coupled and which deal with a transaction that contains all of the tasks A to G of boxes 31 to 43. When the IMS transaction runs, if the transaction is not completed then manual intervention may be required to allow the procedure to be recommenced.

Maintaining transactional integrity is not possible using IMS transactions without writing all the data services, for a given business service, as a single IMS transaction (this is because the business service cannot co-ordinate access to IMS transactions in such a way that if anything fails, the system is rolled back to a known state). Because data services are re-used across multiple business services/transactions, this leads to a situation whereby one needs to build many more IMS transactions, which are more costly to build in the first place, to achieve the same end goal.

Figure 6:
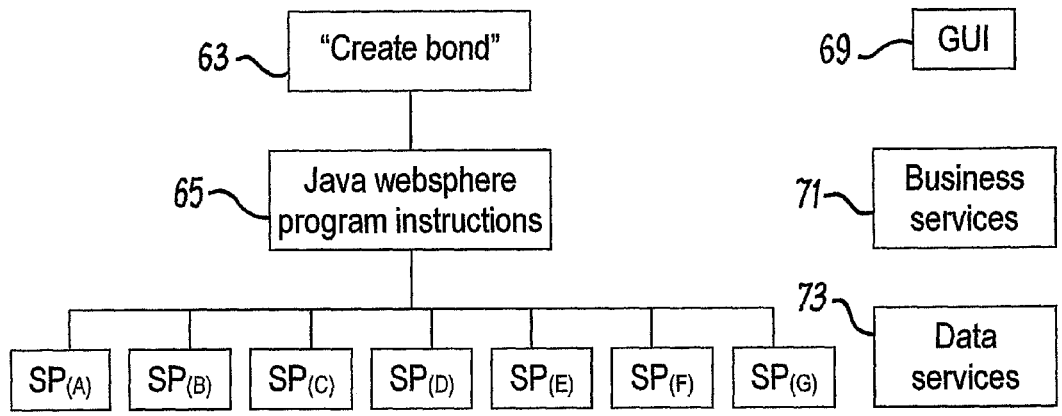
FIG. 6 is a flow chart showing the implementation of the "create bond" instruction as initiated by a user of the graphical user interface in accordance with an example of the present invention.

FIG. 6 is a flow chart 61 showing the implementation of the create bond instruction 63. In this case, java websphere is used order to provide the detailed program instructions which drive the entire process as defined by the "create bond" instruction transaction. This means that the entire business service that can be defined by the "create bond" instruction is programmed as a java websphere business service. Stored procedures 67 A to 67 G map onto boxes 31 to 43 of FIG. 4 and these stored procedures relate to management information (A) 31, withdrawal instructions (B) 33, cash value recorded (C) 35, value written to accounting (D) 37, buy units in chosen fund (E) 39, policy number (F) 41 and commission instructions (G) 43 respectively.

The stored procedures are configured as data services. It can therefore be seen that the separation or decoupling of data services from well defined programmed business services and the initiation of these by a graphical user interface maps very well onto a service oriented architecture and makes it easier to build SOAs.

The prior art IMS transaction of FIG. 5 provides transactional or work unit integrity by tightly coupling the business services and data services required for the create bond instruction transaction into a single unit. In this case, therefore, transactional integrity is maintained by the inclusion of all of these services in a single IMS transaction.

Figure 7:
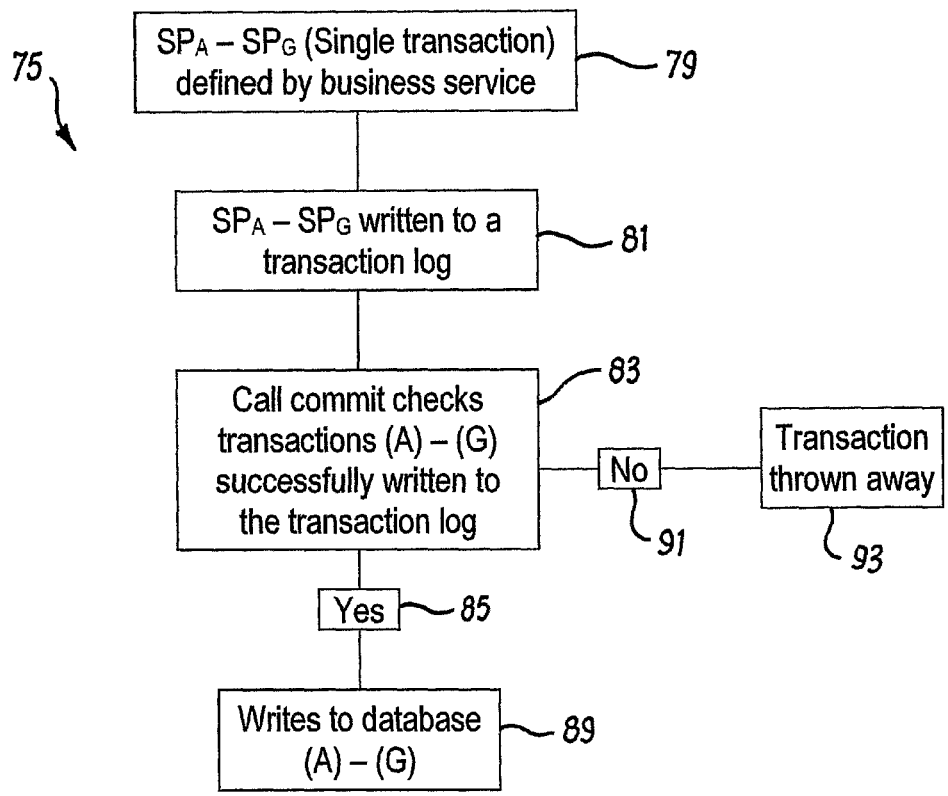
FIG. 7 is a flow chart showing details of the steps undertaken in completing a transaction in accordance with an example of the present invention.

FIG. 7 is a flow chart 75 which shows the manner in which a system using stored procedure maintains transactional integrity. Stored procedures $SP_A$ to $SP_G$ are linked together by the program instructions provided by the business service 79. The store procedures $SP_A$ to $SP_G$ are written to a transaction log 81 and a commit checks that transactions $SP_A$ to $SP_G$ are successfully written to the transaction log. If they are successfully written 85 then data connected with $SP_A$ to $SP_G$ is written to one or more databases. If not 91 then the transaction is thrown away 93.

Accordingly, transactional integrity is maintained by the presence of the commit function which verifies that every write to the transaction log has been successful and moves them from the transaction log to the actual databases.

Figure 8:
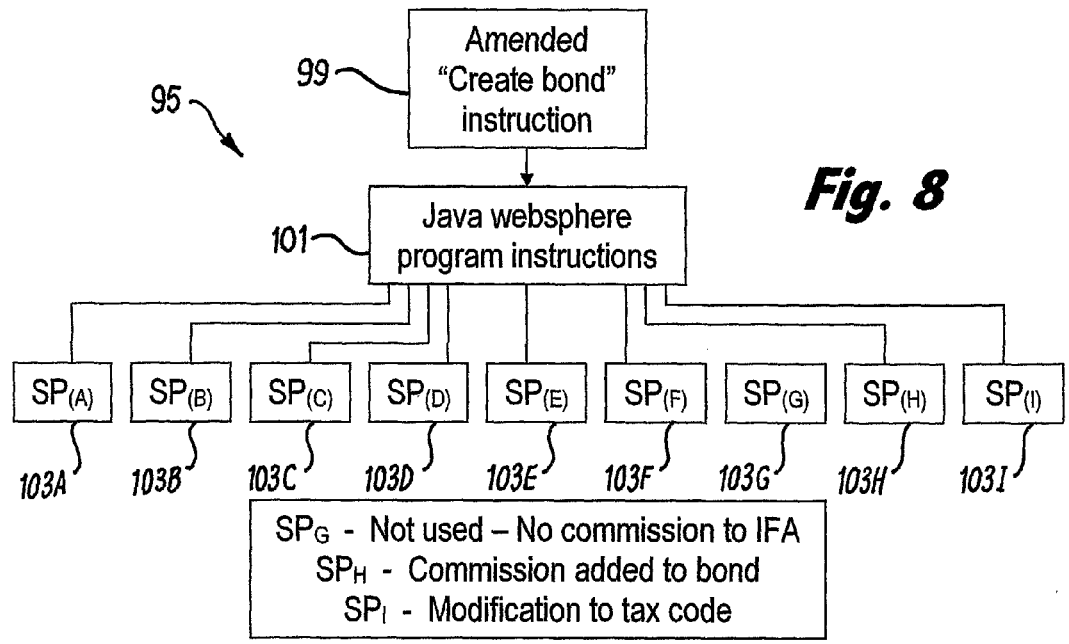
FIG. 8 is a flow chart of an amended "create bond" instruction as implemented in accordance with an example of the present invention.

FIG. 8 is an alternative embodiment relating to a "create bond" instruction that illustrates the flexible nature of the present invention. In life and pension systems, for example, it is often the case that amendments will have to be made to a transaction. In this case a situation has arisen where the IFA received a fee for his advice and therefore commission is not to be paid by the life assurance and pensions company, the commission has to be added to the value of the bond and, in addition, a modification to the tax code or other tax information is to be applied.

As is shown in FIG. 8, flow chart 95 shows the amended create bond instruction 99, the amended java websphere program instructions 101 and the presence of an expanded set of store procedures $SP_A$ to $SP_I$ reference numeral 103A to 103I. Reference numeral 105 denotes a key which provides information on the changes to the business service as implemented through the data services.

In this example, the program to write an amended "create bond" instruction, is provided by a new business service written in java websphere 101, which access stored procedures A to E and store procedures H and F (reference numeral 103A to F and 103H and I).

Therefore, it can be seen that an amendment to a "create bond" instruction can be much more easily implemented with the present invention as it simply involves creating a new business service that reflects the amended transaction and which allows the use of most of the data services that were used to provide the original create bond instruction transaction of FIGS. 6 and 7.

FIG. 9 shows a flow chart 107, in which the store procedures for use in the business service for the amended create bond instruction transaction are defined 109, these are written to a transaction log 111, commit checks the transactions have successfully been written to the transaction log 113, if they have not 115 then the transaction is thrown away 117, if the have 119 then the transaction is written to the relevant databases 121.

FIGS. 10 and 11 relate to another feature of a life assurance and pensions system, namely where an IFA is tasked with submitting information on pension contributions. This information is typically submitted where a person joins a company pension scheme or where contributions increase or decrease. Flow chart 123 describes a prior art system. In this example, a call business service instruction 125 is made by the IFA and an IMS transaction is accessed for the purpose of updating details of, for example, a company pension scheme. Where, for example, a single person joins a company and becomes eligible to join the pension scheme, the IMS transaction in question will contain a mixture of business services and data services that require all the information connected to that particular scheme to be rewritten in order to amend or add details of an individual member. Thereafter, the system will run a batch job to populate the pension contributions database 129.

In contrast, FIG. 11 shows a system in accordance with the present invention. The IFA submits contributions 135 and the IFA's system calls the business service 137. The business service 139 contains program instructions to select a number of stored procedures which contain all of the elements to enable the details of an individual pension scheme contributor to be updated. In this case, a first stored procedure 141 contains header information, payroll information and the like and a second stored procedure 143 provides details of the individual scheme member. Thereafter, this information is written to a database to update the individual members details.

In the case of the system in accordance with the present invention, a business service can be created which allows an individual member's contributions to be amended without re-writing information in respect of all of the members of that pension scheme.

FIGS. 12 and 13 compare and contrast the steps required in changing the address of a pension scheme member.

In the case of the prior art process 147, the instruction to change the address of a scheme member is received 149, the website of the life and pensions provider is accessed 151, details of the change 153 are typed into the website and then sent 155 typically by an IFA. Thereafter these details are received by a system 157, which creates an email 159 which is sent to a mail box 161. Thereafter, this request is read manually 163 and the data is input manually 165 causing the system to be updated 167.

Processes of this type are conducted manually because it is too expensive and complex to program this type of task as an IMS transaction using the existing legacy systems.

Flow chart 169 chose an example of the present invention as used for changing the address of a scheme member. The instruction to change the address of the scheme member is 171 is provided, the IFA accesses the website 173 and types in the details 175 which are then sent 177 to the system. The details are received by the system 179 which then calls a business service called maintain address 181 which calls the store procedures 183 which update the system 185.

It is clear from the above examples of FIGS. 12 and 13 that by implementing a system as a service oriented architecture where business services and data services are decoupled from one another, it is possible to implement a much more flexible system which allows many tasks that are currently undertaken manually, to be undertaken automatically.

FIG. 14 shows a further feature of the present invention in the way it treats legacy systems. In the case of some legacy systems, it is possible to reuse the program instructions contained within an IMS transaction by creating a stored procedure which directly accesses the instruction instead of accessing the instruction through the IMS transaction. This process is known as wrapping the legacy system. FIG. 14 shows diagrams 191 in which the stored procedure 193 is linked to instructions 197 and 201 contained within IMS transactions 195 and 199 respectively. Similarly, stored procedure 203 is linked to program instructions 207 and 211 contained within IMS transactions 205 and 209.

FIG. 15 shows a situation where a new business service is created by the combination of wrapped legacy systems. In this case, the combination of stored procedure 1 and stored procedure 2 is provided by the subset of instructions contained within the union of these stored procedures, namely instructions 201 of IMS transaction 199.

FIG. 16 shows another feature of the present invention, namely that of the use of staging databases. The block diagram of FIG. 16 211 comprises a graphical user interface 223, business service transaction manager 225, data service 227, staging database 229, offline batch process 231 and legacy system 233.

The staging database stores similar data to our legacy system that a new system designed in accordance with the present invention finds it simple to write to, typically, a relational database. The new system writes to the staging database, and a scheduled process (which runs, for example, every night) picks the data up from the staging database and writes it to the legacy system.

This approach may be used where the direction of the data transfer is one-way to the system; that is, it is not expect to get information back from the system. For example, in the case of company valuation systems, a batch process is written to read the new system and copy this information to the legacy systems (hierarchical databases; VSAM files etc.) as required. The existing systems can continue to use to the legacy system until such time that it suits them to migrate away and then they can point at the new system, which contain the data, but in a modern, accessible data store.

Improvements and modifications may be incorporated herein without deviating from the scope of the invention defined by the claims.

The invention claimed is:

1. A computer-implemented method of incorporating legacy systems in a service oriented architecture (SOA), the method comprising executing on a processor the steps of:
   decoupling legacy system business services from legacy system data services;
   creating, from the legacy system business services and data services, in a suitable program application, a set of SOA business services for transactions and stored procedures for SOA data services; wherein the stored procedures are linked together by the program instructions provided by the business services;
   using a computer to write the stored procedures to a transaction log and to perform a commit which verifies that all of the stored procedures from which the business service is constructed have been written to the transaction log, wherein the SOA business service comprises program instructions for selectively accessing the stored procedures and one or more of said business services is constructed from one or more data service, wherein data connected with the stored procedures is written to one or more databases once verification has been received; and
   using the computer to maintain the transactional integrity of the transaction, in use.

2. The method of claim 1, wherein the business service is in control of the transaction.

3. The method of claim 1, wherein the stored procedures have a type safe interface.

4. The method of claim 1, wherein the stored procedures are DB2 stored procedures.

5. The method of claim 1, wherein the business services are run under websphere.

6. The method of claim 1, further comprising accessing legacy system databases writing new programs as stored procedures.

7. The method of claim 1, wherein the legacy systems are accessed via stored procedures.

8. The method of claim 7, wherein the legacy system database so accessed is a hierarchical database.

9. The method of claim 7, wherein the legacy system database so accessed is a relational database.

10. The method of claim 1, further comprising incorporating a staging database.

11. The method of claim 10, wherein the staging database is a newly-developed database, storing similar data to the legacy system that the new system finds it simple to write to.

12. The method of claim 10, wherein the staging database is a relational database.

13. The method of claim 10, wherein the method comprises writing to the staging database, and implementing a scheduled process which picks the data up from the staging database and writes it to the legacy system.

14. The method of claim 13, wherein the scheduled process is run periodically.

15. A computer system having a service oriented architecture (SOA), the system comprising:
   a processor; and
   a memory storing a set of SOA business services for transactions, a set of procedures for SOA data services, and instructions for execution on the processor including instructions to:
   decouple legacy system business services and data services, and
   maintain the transactional integrity of the transaction, in use;
   wherein the stored procedures are written to a transaction log and a commit is performed which verifies that all of the stored procedures from which the business service is constructed have been written to the transaction log and wherein the SOA business service comprises program instructions for selectively accessing the stored procedures and one or more of said business services are constructed from one or more data service; and
   wherein data connected with the stored procedures is written to one or more databases once verification has been received.

16. The computer system of claim 15, wherein the business service controls the transaction.

17. The computer system of claim 15, wherein the stored procedures have a type safe interface.

18. The computer system of claim 15, wherein the stored procedures are DB2 stored procedures.

19. The computer system of claim 15, wherein the business services are run under a J2EE compliant EJB that supports the XA two phase commit protocol.

20. The computer system of claim 15, further comprising stored procedures written to provide access to legacy systems.

21. The computer system of claim 20, wherein said stored procedures access the program components used by the legacy systems.

22. The computer system of claim 15, wherein the system further comprises a staging database.

23. The computer system of claim 22, wherein the staging database stores similar data to the legacy system that the new system finds it simple to write to.

24. The computer system of claim 22, wherein the staging database is a relational database.

25. The computer system of claim 22, wherein the staging database is written to, and scheduled process is implemented which picks the data up from the staging database and writes it to the legacy system.

26. The computer system of claim 25, wherein the scheduled process is run periodically.

\* \* \* \* \*